US007744975B2

(12) United States Patent
Thiele et al.

(10) Patent No.: US 7,744,975 B2
(45) Date of Patent: Jun. 29, 2010

(54) CONTAMINANT REMOVAL TAPE ROLL WITH SHEET REMOVAL FEATURE AND METHOD OF MANUFACTURING THE SAME

(75) Inventors: John L. Thiele, Newport, MN (US); Steven A. Darmer, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1246 days.

(21) Appl. No.: 10/884,575

(22) Filed: Jul. 2, 2004

(65) Prior Publication Data
US 2006/0003129 A1    Jan. 5, 2006

(51) Int. Cl.
*B32B 9/00* (2006.01)
*B65D 65/28* (2006.01)
*A47L 13/00* (2006.01)
*A47L 25/00* (2006.01)

(52) U.S. Cl. .................. 428/40.1; 428/42.2; 428/42.3; 428/43; 428/906; 15/104.001; 15/104.002

(58) Field of Classification Search ............ 15/104.002, 15/104.001; 428/40.1, 43, 42.2, 42.3, 906
See application file for complete search history.

(56) References Cited

U.S. PATENT DOCUMENTS

| | | | |
|---|---|---|---|
| 2,401,842 A | 6/1946 | Slater | |
| 3,115,663 A | 12/1963 | Hulst | |
| 3,177,512 A | 4/1965 | Balaban | |
| 3,192,548 A | 7/1965 | Wilbrecht | |
| 3,201,815 A | 8/1965 | Selby | |
| 3,343,194 A | 9/1967 | Ramelson | |
| 3,378,871 A | 4/1968 | Suleski | |

(Continued)

FOREIGN PATENT DOCUMENTS

JP    8-322778    12/1996

(Continued)

OTHER PUBLICATIONS

Adhesion and Adhesives Technology an Introduction, p. 216-244, Alphonsus V. Pocius, Hanser Gardner Publications, Inc., 1997.

(Continued)

*Primary Examiner*—Patricia L Nordmeyer
(74) *Attorney, Agent, or Firm*—Trisha D. Adamson

(57) ABSTRACT

A roll of contaminant removal tape defining opposing longitudinal ends, opposing side edges, and opposing major surfaces. The tape is wound into a roll and includes a backing layer, an adhesive layer, a plurality of lines of perforations, and a set of discrete non-adhesive zones. The adhesive layer is applied to a first side of the backing layer to define a portion of the first major surface. The lines of perforations extend across at least most of the width of the tape between the first and second side edges to separate the tape into sheets. The non-adhesive zones are provided along the first major surface of the tape, with each non-adhesive zone extending from the first side edge. In one embodiment, the lines of perforations are progressively longitudinally spaced from one another, and respective ones of the non-adhesive zones correspond with respective ones of the lines of perforations.

28 Claims, 8 Drawing Sheets

U.S. PATENT DOCUMENTS

| | | | |
|---|---|---|---|
| 3,381,325 A | 5/1968 | Reineman |
| 3,417,418 A | 12/1968 | Riboud |
| 3,421,170 A | 1/1969 | Thomas, Jr. |
| 3,623,179 A | 11/1971 | Roth |
| 3,742,547 A | 7/1973 | Sohmer |
| 3,886,621 A | 6/1975 | Welsh |
| 3,918,920 A | 11/1975 | Barber |
| 3,958,292 A | 5/1976 | Powell |
| 4,128,909 A | 12/1978 | Kawabe et al. |
| 4,222,201 A | 9/1980 | Yanessa |
| 4,361,923 A | 12/1982 | McKay |
| 4,399,579 A | 8/1983 | McKay |
| 4,422,201 A | 12/1983 | McKay |
| 4,427,726 A | 1/1984 | Wolfrum |
| D273,058 S | 3/1984 | McKay |
| D273,059 S | 3/1984 | McKay |
| D276,763 S | 12/1984 | McKay |
| 4,546,011 A | 10/1985 | Wolfrum |
| D281,654 S | 12/1985 | Bladh et al. |
| 4,557,011 A | 12/1985 | Sartori |
| D288,973 S | 3/1987 | Hamazaki |
| 4,727,616 A | 3/1988 | Kucera et al. |
| 4,905,337 A | 3/1990 | McKay |
| D307,949 S | 5/1990 | Wong |
| 4,979,257 A | 12/1990 | Heneveld |
| 4,979,614 A | 12/1990 | Ruhaut |
| 5,027,465 A | 7/1991 | McKay |
| 5,074,098 A | 12/1991 | Filipchuk |
| D336,784 S | 6/1993 | Yen |
| D341,256 S | 11/1993 | Brazis et al. |
| D342,610 S | 12/1993 | Stetson et al. |
| 5,333,341 A | 8/1994 | Heneveld |
| 5,388,300 A | 2/1995 | Hickey |
| 5,641,075 A | 6/1997 | Mechlin |
| 5,709,301 A | 1/1998 | Couch et al. |
| 5,763,038 A | 6/1998 | Wood |
| D396,906 S | 8/1998 | Medici |
| 5,878,457 A | 3/1999 | Cox et al. |
| 5,924,157 A | 7/1999 | Barela |
| 5,940,921 A | 8/1999 | Wood et al. |
| 6,014,788 A | 1/2000 | Jaffri |
| 6,055,695 A | 5/2000 | McKay, Jr. |
| 6,127,014 A | 10/2000 | McKay, Jr. |
| 6,427,278 B1 | 8/2002 | McKay, Jr. |
| D463,134 S | 9/2002 | Vosbikian |
| 6,449,794 B1 | 9/2002 | Jaffri |
| D468,540 S | 1/2003 | Jessen |
| D475,537 S | 6/2003 | Jessen et al. |
| D475,538 S | 6/2003 | Jessen et al. |
| D483,570 S | 12/2003 | Heidel et al. |
| 6,688,464 B2 | 2/2004 | Jessen et al. |
| 6,763,977 B2 | 7/2004 | McKay |
| 2002/0088070 A1 | 7/2002 | Cho |
| 2003/0039824 A1 | 2/2003 | Aalbers |
| 2003/0154569 A1 | 8/2003 | McKay |

FOREIGN PATENT DOCUMENTS

| | | |
|---|---|---|
| JP | 9-75293 | 3/1997 |
| WO | WO 83/01734 | 5/1983 |
| WO | WO 2004087825 A | 10/2004 |

OTHER PUBLICATIONS

Three photographs of the "Scotchbrite® Rolo Adhesivo" product referred to on p. 3, lines 19-28 of the specification.

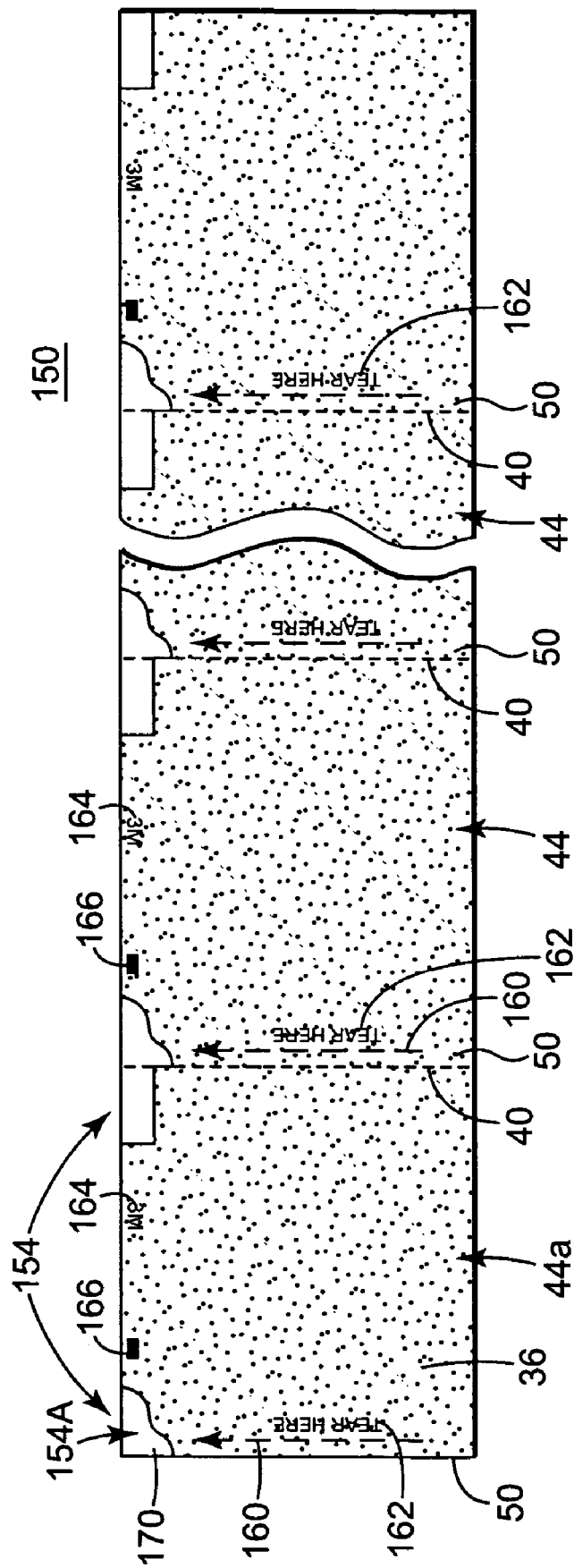

CONTAMINANT REMOVAL TAPE ROLL WITH SHEET REMOVAL FEATURE AND METHOD OF MANUFACTURING THE SAME

BACKGROUND

The present invention relates to a contaminant removal tape roll, a contaminant removal tape roll assembly, and methods of manufacturing a contaminant removal tape roll. More particularly, it relates to contaminant removal tape rolls adapted to facilitate removal of a used sheet, assemblies for using the tape rolls, and methods of manufacturing the tape rolls.

A variety of contaminant or lint removal devices are known. Lint removal devices remove lint and other small particles or contaminants, such as hair or threads (collectively referred to as "contaminants"), from a surface, such as clothing. One known form of a lint removal device includes contaminant removal tape that wound into a roll with an adhesive side of the tape facing outwardly. With this orientation, the contaminant removal tape roll is rolled against the surface in question to remove lint and other small particles therefrom. In particular, the contaminants adhere to the adhesive side of the tape. A roll of contaminant removal tape is typically used in conjunction with an applicator.

When the outer wrap of the above-described roll of contaminant removal tape is saturated with lint, small particles, and other contaminants, the outer wrap is removed from the roll and discarded. To this end, rolls of contaminant removal tape are often perforated, such as with lines of perforations, to facilitate this removal process. In particular, lines of perforations divide the tape into sheets, with each sheet being generally equivalent to a singular wrap about the tape roll circumference. In some instances, the lines of perforations are uniformly spaced, such that each sheet of the roll has an identical length. Alternatively, and as described in U.S. Pat. No. 5,763,038 (Wood) entitled "Progressively Perforated Tape Roll", a longitudinal spacing between the lines of perforations progressively increases from an inside of the roll, such that the wound sheets have progressively increasing lengths. With this technique, the outermost sheet covers all of the lines of perforations to reduce instances of the tape tearing in a downweb direction. Alternatively, U.S. Pat. No. 6,127,014 (McKay, Jr.) "Adhesive Roller Construction" describes varying the longitudinal spacing between the lines of perforations such that each sheet is semi-randomly longer than, shorter than, or the same size as its underlying sheet.

Regardless of exact construction, removal of the used, outermost sheet from the roll of tape requires a user to locate a leading end of the outermost sheet and peel the leading end away from a remainder of the roll. This task can at times be difficult, due at least in part to the somewhat "hidden" nature of the leading end following a lint-removing operation, as well as adhering of the leading end to an immediately underlying wrap. By way of background, a roll of contaminant removal tape can be described as having sheets and wraps. A "sheet" is defined as a length of tape between two consecutive lines of perforations, whereas a "wrap" is defined as one complete revolution about a circumference of the roll. Thus, as the roll diameter decreases, the longitudinal length of a "wrap" also decreases. Conversely, the longitudinal length of a "sheet" is dictated solely by the spacing between lines of perforations. With this in mind, in many instances, the outermost sheet forms an entirety of the outermost wrap and further overlaps on to itself, such that an immediately underlying wrap will include a trailing portion of the outermost sheet. Alternatively, the immediately underlying wrap can be comprised of a sheet(s) separate from the outermost sheet. In any event, following a contaminant-removing operation, all exposed adhesive of the outermost sheet will retain lint, particles, etc., essentially uniformly covering the leading end and the tape adjacent thereto with dark material. This tends to obscure visual recognition of the leading end location. Further, in regions where the leading end contacts adhesive provided by the immediately underlying wrap, effort is required to lift the leading end away from the roll. For example, a user may find it necessary to pick at the leading end with her/his fingernail in order to initiate peeling of the outermost sheet's leading end.

The generally accepted technique employed to address the above concerns is to provide a continuous, non-adhesive strip along both side edges of the tape. For example, where the adhesive is coated onto a backing layer, a zone-coating methodology can be utilized whereby no adhesive is applied along the opposing edges (e.g., each continuous, non-adhesive strip has a width on the order of 0.25 inch (6.35 mm)). Alternatively, the adhesive can be applied across an entire width of the backing layer; subsequently, a detackifying material is applied over the adhesive along the opposing side edges of the tape. With either approach, the side edges of the tape (on the adhesive side thereof) are continuously non-adhesive. As a result, lint, particles, etc. will not adhere to the continuous, non-adhesive side edges, thus improving visual recognition of the leading end of the outermost sheet at the non-adhesive edge. Further, the leading end can more easily be gasped by the user at the non-adhesive side edge, and can more easily be peeled from the immediately underlying wrap because, relative to the non-adhesive side edge of the immediately underlying wrap, the outermost sheet is not adhered to the immediately underlying wrap.

Even with the above-described improvements, users may still find it difficult to locate the leading edge of a soiled, outermost sheet of a roll of contaminant removal tape and/or initiate removal of the outermost sheet from the roll. Also, consumers may perceive the continuous, non-adhesive edges as constituting wasted cleaning surface area. Additionally, the continuous, non-adhesive side edges may negatively impact a user's ability to access and clean all desired surfaces. One such instance is a surface at or near a wall or other corner. Because the side edges of the outermost sheet are not available for removing contaminants, the user must attempt to position the center, adhesive-providing portion of the outermost sheet in the corner. Unfortunately, depending upon the diameter of the roll of contaminant removing tape and/or the corner configuration, it may not be possible to do so.

Efforts have been made with a product sold under the tradename "Scotchbrite® Rolo Adhesivo", available from 3M Brazil to apply printed, dashed lines adjacent the lines of perforations, in a color different from a remainder of the roll, thereby giving a general, visual indication of the leading end location following a contaminant-removing operation. Unfortunately, this approach repeats the previous technique of providing continuous, non-adhesive strips along the tape side edges. Further, the Scotchbrite® Rolo Adhesivo entails uniformly spaced lines of perforations, and thus fixed sheet lengths, possibly leading to wasted sheet surface area on the inner roll sheets. Thus, this approach may be less viable with longer sheet-type contaminant removal tape roll products, such as products marketed for cleaning floors. Also, U.S. Publication No. 2003/1054569A1 (McKay) entitled "Lint Removal Apparatus With Pull Tab For Adhesive Coated Sheets" appears to describe a contaminant removal tape roll in which the lines of perforations define a central, pull tab-like structure, and non-adhesive portions are formed that encompass each pull tab-like structure and areas adjacent thereto.

Contaminant removal tape rolls continue to be highly popular with consumers. Any efforts to improve use of these products, such as identification and removal of used sheets as well as enhanced available adhesive surface area, would be beneficial.

SUMMARY

One embodiment of the present invention relates to a roll of contaminant removal tape. The tape defines opposing longitudinal ends, opposing side edges, and opposing major surfaces. With this in mind, the tape is wound into a roll and includes a backing layer, an adhesive layer, a plurality of lines of perforations, and a first set of discrete non-adhesive zones. The backing layer has a first side and a second side. The adhesive layer is applied to the first side of the backing layer such that the adhesive layer defines a portion of the first major surface of the tape. The plurality of lines of perforations extend across at least most of the width of the tape between the first and second side edges to separate the tape into sheets each having a leading end and a trailing end. In roll form, the leading end of an outermost sheet defines the first longitudinal end of the tape. The first set of discrete non-adhesive zones are provided along the first major surface of the tape, with each non-adhesive zone extending from the first side edge of the tape. In one embodiment, the lines of perforations are progressively longitudinally spaced from one another, and respective ones of the non-adhesive zones correspond with respective ones of the lines of perforations.

Another embodiment of the present invention relates to a length of tape for use in a roll of contaminant removal tape. The tape is defined by opposing longitudinal ends, opposing side edges, and opposing major surfaces. The tape includes a backing layer, an adhesive layer, and a plurality of lines of perforations. The adhesive layer is applied to a first side of the backing layer so as to define a portion of the first major surface. The lines of perforations separate the tape into sheets, with each sheet further being defined by the opposing side edges of the tape. Each sheet includes first and second non-adhesive zones. The non-adhesive zones extend along the first major surface from the first side edge. Further, a longitudinal spacing exists between the first and second non-adhesive zones along the sheet, with the adhesive layer encompassing and being exposed within the longitudinal spacing.

Another embodiment of the present invention relates to a roll of contaminant removal tape. The tape defines opposing longitudinal ends, opposing side edges, and opposing major surfaces. The tape is wound into a roll and includes a backing layer, an adhesive layer, a plurality of lines of perforations, and a set of discrete non-adhesive zones. The adhesive layer is applied to a first side of the backing layer such that the adhesive layer defines a portion of the first major surface of the tape. The plurality of lines of perforations extend across at least most of the width of the tape between the first and second side edges to separate the tape into sheets. To this end, the line of perforations are arranged such that starting from an inside of the roll, the sheets have progressively increasing lengths from the second longitudinal end of the tape to the first longitudinal end. The set of non-adhesive zones are provided along the first major surface of the tape, with respective ones of the non-adhesive zones being registered with respective ones of the lines of perforations.

Another embodiment of the present invention relates to a method of manufacturing a roll of contaminant removal tape. The method includes providing a length of a backing layer having first and second sides. An adhesive layer is applied to the first side of the backing layer to define a portion of a first major surface of the tape. A plurality of lines of perforations are formed across at least most of a width of the backing layer to define a plurality of separable sheets. A set of discrete non-adhesive zones are formed on the first major surface of the tape, with each non-adhesive zone extending from a first side edge of the tape. In one embodiment, the non-adhesive zones are formed by printing a detackifying material on to the adhesive layer via a flexographic printer.

BRIEF DESCRIPTION OF THE DRAWINGS

FIG. 6A is a top view of a portion of another alternative embodiment roll of contaminant removal tape in accordance with the present invention, with the tape unrolled;

DETAILED DESCRIPTION

Figure 1:
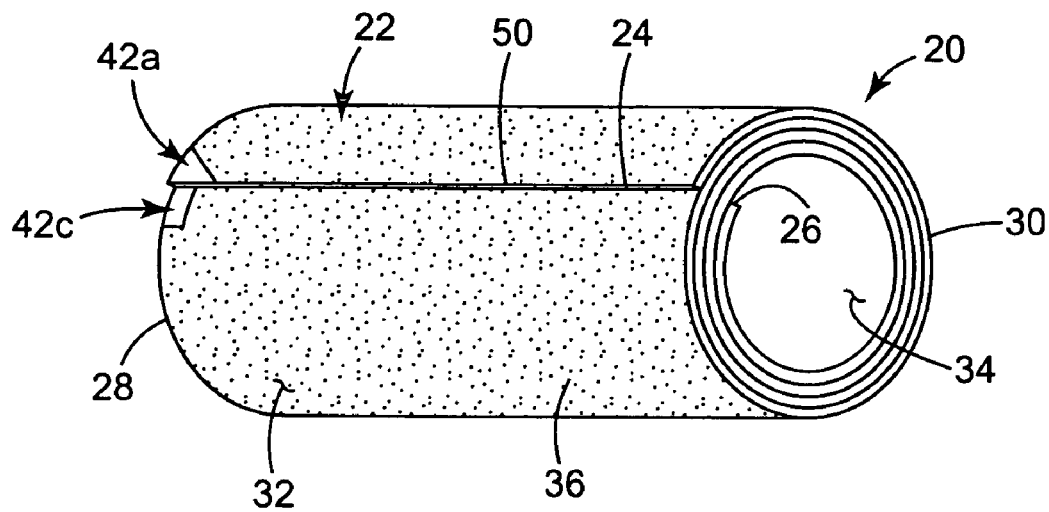
FIG. 1 is a perspective view of one embodiment of a roll of contaminant removal tape in accordance with the present invention.
Figure 2:
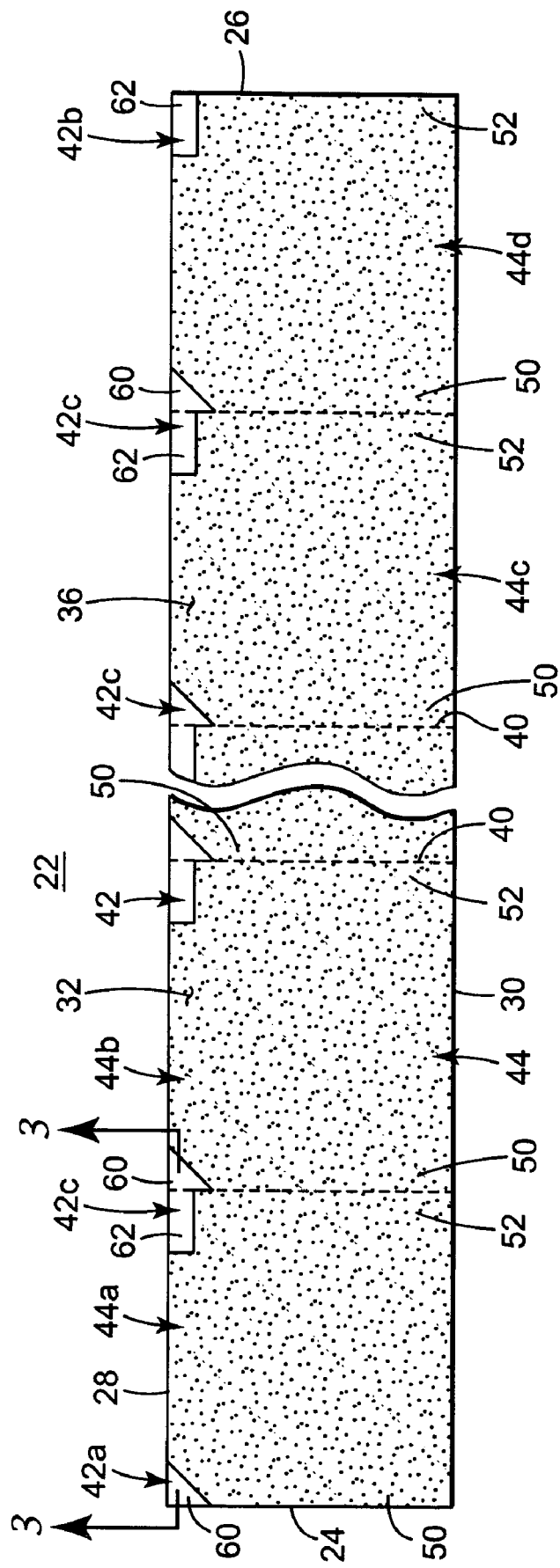
FIG. 2 is a top view of a portion of the roll of contaminant removal tape of FIG. 1, with the tape unrolled.

One embodiment of a roll 20 of contaminant removal tape 22 in accordance with the present invention is shown in FIGS. 1 and 2. The tape 22 includes a first longitudinal end 24, a second longitudinal end 26, a first side edge 28, and a second side edge 30, and defines a first major surface 32 and a second major surface 34 (relative to the view of FIG. 2, the second major surface 34 is hidden, and is opposite the first major surface 32 shown). The first major surface 32 includes an adhesive layer 36 (shown generally by stippling in FIGS. 1 and 2) that is otherwise applied to a backing layer 38 (shown in FIG. 3). When wound into the roll 20, the tape 22 is oriented such that the layer of adhesive 36 faces outwardly, away from a center of the roll 20. Finally, the tape 22 includes a plurality of lines of perforations 40 (FIG. 2) and a set of discrete non-adhesive zones 42. The lines of perforations 40 separate the tape 22 into sheets 44. As described in greater detail below, the non-adhesive zones 42 facilitate visual recognition and removal of successive ones of the sheets 44 from a remainder of the roll 20 following use of the roll 20.

The roll 20 of contaminant removal tape 22 is not illustrated as including a core or any support material. However, the roll 20 can optionally include a core, where the multiple wraps of the contaminant removal tape 22 are wrapped about the core.

The lines of perforations 40 define each sheet 44 to have a leading end 50 and a trailing end 52. The terms "leading" and "trailing" are with reference to the tape 22 when wound as the roll 20. For example, FIG. 2 illustrates a first sheet 44a, a second sheet 44b, a third sheet 44c, and a fourth sheet 44d. The first sheet 44a is also viewable in the illustration of FIG. 1, and thus defines an outermost sheet of the roll 20. As such, the leading end 50 of the outermost sheet 44a is also the first longitudinal end 24 of the tape 22. Conversely, the fourth sheet 44d is the innermost sheet of the roll 20, with the trailing end 52 of the innermost sheet 44d serving as the second longitudinal end 26 of the tape 22. With these conventions in mind, the trailing end 52 of the outermost sheet 44a is adjacent the leading end 50 of the second sheet 44b (such that relative to the roll 20, the second sheet 44b serves as an immediately underlying sheet). Similarly, the trailing end 52 of the third sheet 44c is adjacent the leading end 50 of the innermost sheet 44d. Regardless, each of the sheets 44 is further defined by the first and second side edges 28, 30 of the tape 22.

The lines of perforations 40 extend across at least most of the width of the tape 22 (i.e., at least 90% of the width, more preferably at least 95% of the width, even more preferably an entirety of the width). In one embodiment, a longitudinal spacing or distance between consecutive ones of the lines of perforations 40 progressively increased from the second (or innermost) longitudinal end 26 of the tape to the first (or outermost) longitudinal end 24. With this construction, the sheets 44 have progressively increasing longitudinal lengths from the second longitudinal end 26 to the first longitudinal end 24. This progressively increasing perforation configuration is described, for example, in U.S. Pat. No. 6,763,038 (Wood) "Progressively Perforated Tape Roll", the teachings of which are incorporated by reference. Alternatively, spacing between adjacent ones of the lines of perforations 40 can be uniform or can vary such that each sheet is semi-randomly longer than, shorter than, or the same size as its underlying sheet. The lines of perforations 40 can be physically formed in a variety of manners as is known in the art, and can employ different cut lengths (e.g., can be defined by perforation cuts, slit cuts, etc.).

Regardless of a configuration of the lines of perforations 40, the set of non-adhesive zones 42 are provided along the first major surface 32, extending from the first side edge 28. Formation of the non-adhesive zones 42 is described in greater detail below. In general terms, however, the non-adhesive zones 42 are spaced from one another along a longitudinal length of the tape 22, and, in one embodiment, correspond with respective ones of the lines of perforations 40, with each non-adhesive zone 42 extending between two adjacent sheets 44. Relative to a wound roll 20 that otherwise includes two or more of the sheets 44, the non-adhesive zones 42 include an outermost non-adhesive zone 42a, an innermost adhesive zone 42b and one or more intermediate non-adhesive zones 42c spaced along a longitudinal length of the tape 22. The intermediate non-adhesive zones 42c are, in one embodiment, identical, whereas the outermost non-adhesive zone 42a and the innermost non-adhesive zone 42b represent portions of the intermediate non-adhesive zones 42c. For example, each of the intermediate non-adhesive zones 42c include a tab portion 60 and a release portion 62. Relative to two adjacent sheets 44, such as the first sheet 44a and the second sheet 44b, the tab portion 60 is formed on the second sheet 44b, extending from the leading end 50 thereof. Conversely, the release portion 62 is formed on the first sheet 44a, extending from the trailing end 52 thereof. In one embodiment, then, the outermost non-adhesive zone 42a includes the tab portion 60, whereas the innermost non-adhesive zone 42b includes the release portion 62.

Interface between the non-adhesive zones 42 and the various sheets 44 is described below. In one embodiment, however, the adhesive layer 36 extends between, and is exposed relative to, adjacent ones of the non-adhesive zones 42. That is to say, in one embodiment, other than at the non-adhesive zones 42, the adhesive layer 36 is provided and exposed (i.e., not covered by a detackifying material) along an entirety of the sheet surface area, including the side edges 28, 30, and is available for collecting contaminants. Thus, the adhesive layer 36 defines a large majority of the first major surface 32 of the tape 22, preferably at least 90%, more preferably at least 92%, even more preferably at least 95%.

The tab portion 60 of the non-adhesive zones 42 is configured to facilitate grasping of the leading end 50 of the sheet 44 to which it is applied, and, in one embodiment, is triangular. As described below, a wide variety of other shapes are equally acceptable. The release portion 62 is configured to facilitate release of an overlying sheet 44 (when the tape 22 is in roll form), and, in one embodiment, is rectangular. Again, other shapes are equally acceptable.

As previously described, in one embodiment, the non-adhesive zones 42 are formed to correspond with respective ones of the lines of perforations 40. More particularly, the non-adhesive zones 42 and the lines of perforations 40, respectively, are registered relative to one another. Thus, with respect to the one embodiment of FIG. 2, whereby the lines of perforations 40 are progressively spaced, the non-adhesive zones 42 are similarly progressively spaced, such that a longitudinal spacing between consecutive non-adhesive zones 42 progressively increases from the second longitudinal end 26 of the tape 22 to the first longitudinal end 24. Alternatively, with varying configurations of the roll 20, the non-adhesive zones 42 can be uniformly longitudinally spaced and need not be precisely registered relative to a corresponding line of perforations 40.

Figure 3A:
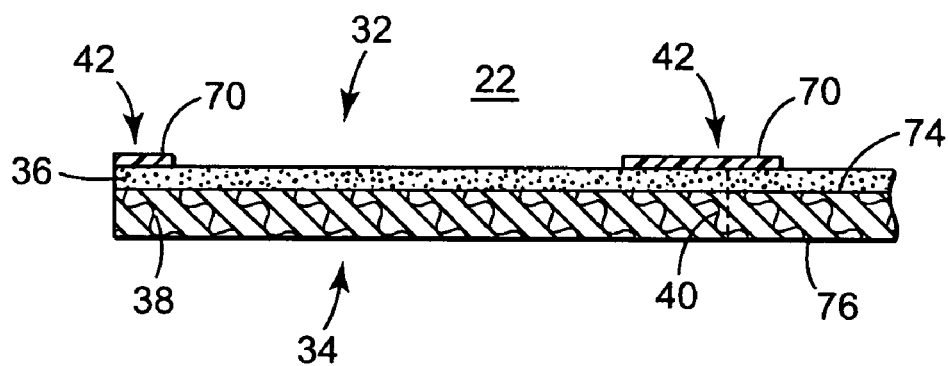
FIG. 3A is an enlarged, cross-section view of a portion of the tape of FIG. 2, taken along the line 3-3.

One construction of the tape 22 providing the discrete, spaced non-adhesive zones 42 along the first side edge 28 is provided in FIG. 3A. In particular, the tape 22 is illustrated as including the backing layer 38, the adhesive layer 36, and a detackifying material 70 that otherwise serves to define the non-adhesive zones 42. The backing layer 38 includes a first side 74 and a second side 76. With this approach, the adhesive layer 36 is applied across an entirety of the first side 74 of the backing layer 38, with the detackifying material 70 being applied (e.g., printed) on to the adhesive layer 36 (opposite the backing layer 38) at desired locations. Thus, the first major surface 32 of the tape 22 is defined by the detackifying material 70 and all areas of the adhesive layer 36 that are not otherwise covered by the detackifying material 70 (i.e., the "exposed" portions of the adhesive layer 36). As a point of reference, thicknesses of the various components 36, 38 and 70 are exaggerated in FIG. 3A to better illustrate their relationships. Further, FIG. 3A more clearly illustrates registration of one of the non-adhesive zones 42 relative to, and extension across, a corresponding one of the lines of perforations 40.

Examples of suitable materials for the backing layer 38 include paper, polymeric and plastic film materials including polyolefins such as polyethylene, polypropylene, copolymers of ethylene or propylene, halogenated polymers such as poly(vinyl chloride) and poly(vinylidene chloride), polyesters such as polyethylene terephthalate, polyurethanes, and poly(vinyl acetate) and vinyl acetate copolymers. Polypropylenes can include monoaxially oriented polypropylene, biaxially oriented polypropylene, simultaneously biaxially oriented polypropylene, and untensilized polypropylene including untensilized isotactic polypropylene. Various types of non-woven synthetic polymeric backings including spun-bound polyethylene could be used. The backing material can be compostible or degradable, can be colored, can be printed, and can be of different surface textures or embossed.

Suitable adhesives for the adhesive layer 36 include hot melt-coated formulations, transfer-coated formulations, solvent-coated formulations, and latex formulations. The contaminant adhesive tape 22 includes at least one layer of adhesive 36. Preferably, the layer of adhesive is a pressure-sensitive adhesive. General categories of pressure-sensitive adhesives can be based on natural rubber, styrene butadiene, butyl rubber and polyisobutylene, styrenic block copolymers, ethylene-vinyl acetate and related copolymers, poly-alpha olefins, acrylic adhesives, silicone, butadiene-acrylonitrile, polychloroprene, polybutadiene, atactic polypropylene, or repulpable pressure-sensitive adhesive. (From the Handbook of Pressure Sensitive Adhesive Technology, Third Edition, Edited by Donatas Satas, Satas & Associates, 1999.) However, other pressure-sensitive adhesives may be used for adhesive layer of the adhesive article, such as those with the properties described in Adhesion and Adhesives Technology an Introduction, p. 216, Alphonsus V. Pocius, Hanser Gardner Publications, Inc., 1997. The Pressure-Sensitive Tape Council has defined pressure-sensitive adhesives as materials with the following properties: 1) aggressive and permanent tack; 2) adheres with no more than finger pressure; 3) requires no activation by any energy source; 4) has sufficient ability to hold onto the adherend; and 5) has enough cohesive strength to be able to be removed cleanly from the adherend.

Examples of adhesives useful in for the adhesive layer 36 include those based on general compositions of polyacrylate; polyvinyl ether; diene-containing rubber such as natural rubber, polyisoprene, and polyisobutylene; polychloroprene; butyl rubber; butadiene-acrylonitrile polymer; thermoplastic elastomer; block copolymers such as styrene-isoprene and styrene-isoprene-styrene block copolymers, ethylene-propylene-diene polymers, and styrene-butadiene polymer; poly-alpha-olefin; amorphous polyolefin; silicone; ethylene-containing copolymer such as ethylene vinyl acetate, ethylacrylate, and ethyl methacrylate; polyurethane; polyamide; epoxy; polyvinylpyrrolidone and vinylpyrrolidone copolymers; polyesters; and mixtures of the above. Additionally, the adhesives can contain additives such as tackifiers, plasticizers, fillers, antioxidants, stabilizers, pigments, diffusing particles, curatives, and solvents.

The adhesive layer 36 may be coated on the first side 74 of the backing layer 38 by any method known in the art, such as by gravure coating, vacuum coating, rotary rod coating, drop die coating, slot die coating, curtain coating, meyer rod coating, knife coating, coating by a nip, or extrusion coating.

The detackifying material 70 can assume a variety of forms, such as wax, varnish, lacquer or ink. In one embodiment, the detackifying material 70 is a detackifying varnish available from Sun Chemical Corporation under the trade name SSB 10062F/D. As used throughout this specification, "non-adhesive zone" means an area or surface which has or is formed of a partial or complete non-adhesive surface or coating. A "non-adhesive zone" can have some adhesive characteristics (e.g., can be slightly tacky), but is significantly less adhesive or tacky as compared to exposed portions of the adhesive layer 36 (i.e., characterized by being non-tacky to the touch of a finger, with little tendency for debris to adhere). In addition, the detackifying material 70 can include a pigment to further distinguish the non-adhesive zones 42 from a remainder of the tape 22.

The tape 22 may optionally include a release coating (not shown) on the second side 76 of the backing layer 38. For example, a low adhesion backsize (LAB) layer can be formed on the second side 76 of the backing layer 38 to facilitate removing an outermost sheet or wrap from the role 20. Suitable LAB layers include silicones, fluorochemicals, acrylates, and polyvinylacetates. Numerous other layers can be added to the tape 22, such as primers to increase adhesion of the adhesive layer 36 to the backing layer 38. As described in greater detail below, printed indicia can be formed on the tape 22. The tape 22 can further contain deodorants, perfumes, antistatic materials, and encapsulated cleaning chemicals. Also, the backing layer 38 can be modified by flame treatment, corona treatment and roughening.

Figure 3B:
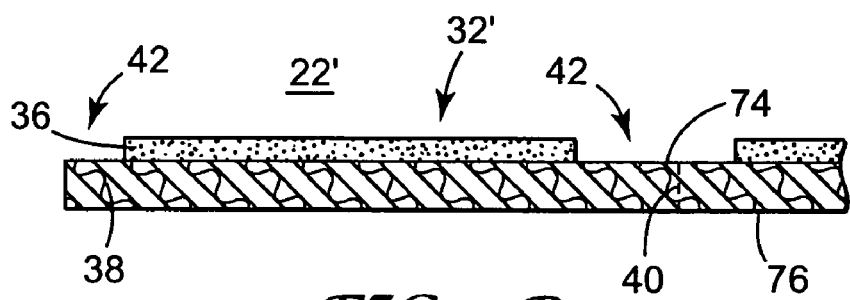
FIG. 3B is an enlarged, cross-sectional view of a portion of an alternative embodiment contaminant removal tape in accordance with the present invention.

In an alternative embodiment, the non-adhesive zones 42 are formed by uncoated portions of the adhesive layer 36. For example, FIG. 3B illustrates a portion of an alternative embodiment contaminant removal tape 22' otherwise useful as a roll of contaminant removal tape. The tape 22' includes the backing layer 38 and the layer of adhesive 36. The layer of adhesive 36 is uncoated at discrete locations relative to the first side edge 28 (FIG. 2) to define the non-adhesive zones 42. With this construction, the layer of adhesive 36 and the exposed portions of the first side 74 of the backing layer 38 (i.e., the non-adhesive zones 42) combine to define a first major surface 32' of the tape 22'

Regardless of exact construction and returning to FIGS. 1 and 2, the non-adhesive zones 42 facilitate visual recognition of the leading end 50 of the outermost sheet 44a following use of the roll 20 and subsequent removal of the outermost sheet 44a, while maximizing the area of exposed adhesive. For example, FIG. 1 illustrates with stippling the exposed adhesive layer 36 of the outermost sheet 44a, as well as the leading end 50 thereof. The outermost non-adhesive zone 42a, otherwise located at the first side edge 28 and extending from the leading end 50, is illustrated in FIG. 1 without stippling, thus exemplifying the ease with which a user can visually identify a location of the leading end 50 relative to a remainder of the roll 20. Further, one of the intermediate non-adhesive zones 42c is also visible in the view of FIG. 1. Once again, the intermediate non-adhesive zone 42c will not retain contaminants, and thus provides further visual confirmation to a user of a location of the leading end 50.

Figure 4:
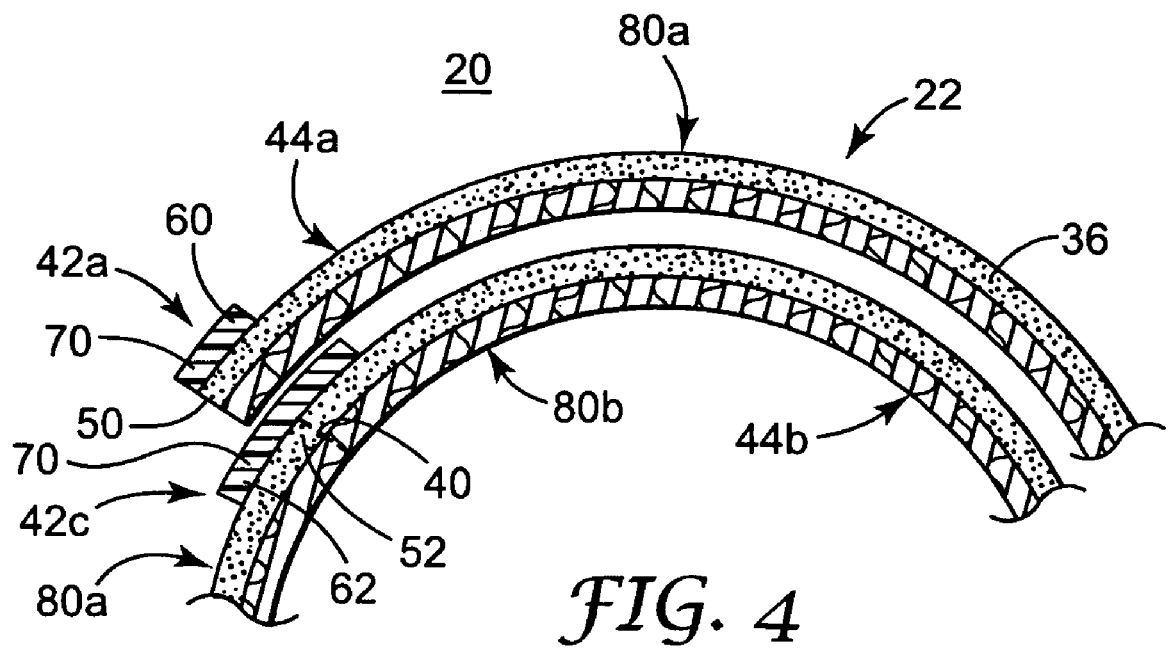
FIG. 4 is an enlarged, side view of a portion of the roll of contaminant removal tape of FIG. 1.

To better understand a relationship of the non-adhesive zones 42 relative to an outermost sheet in accordance with one embodiment of the present invention, reference is further made to FIG. 4. FIG. 4 provides an enlarged side view of a portion of the roll 20 of FIG. 1, with various layers exaggerated in thickness. The tape 22 is wound to define a plurality of wraps 80, including an outermost wrap 80a and an immediately underlying wrap 80b. As a point of reference, successive wraps underlying the immediately underlying wrap 80b are not shown in FIG. 4. With the one embodiment of FIG. 4, the outermost sheet 44a defines an entirety of the outermost wrap 80a. Further, the outermost sheet 44a overlaps onto itself, such that a portion of the immediately underlying wrap 80b is also defined by the outermost sheet 44a. In other words, the leading end 50 of the outermost sheet 44a covers the line of perforation 42 that otherwise separates the sheets 44a and 44b. A remainder of the immediately underlying wrap 80b is defined by the second sheet 44b. Finally, the outermost sheet 44a is shown as including the outermost non-adhesive zone 42a (defined by the detackifying material 70). The intermediate non-adhesive zone 42c is shown as extending between the outermost sheet 44a and the second (or immediately underlying) sheet 44b.

With the above conventions in mind, the leading end 50 of the outermost sheet 44*a* lies on top of the intermediate non-adhesive zone 42*c*, and in particular the release portion 62 thereof. The outermost sheet 44*a* can be easily removed from the roll 20 by grasping the outermost sheet 44*a* at the outermost non-adhesive zone 42*a* (i.e., the tab portion 60) that is otherwise located at a corner defined by the leading end 50 and the first side edge 28 (FIG. 2). The intermediate non-adhesive zone 42*c* is directly beneath this corner, such that the immediately underlying wrap 80*b* does not adhesively impede lifting or peeling of the corner away from the roll 20. Once lifted, the user continues grasping the outermost sheet 44*a* at the outermost non-adhesive zone 42*a*, pulling a remainder of the outermost sheet 44*a* away from the roll 20. This pulling operation continues until the trailing end 52 of the outermost sheet 44*a* is lifted from the roll 20. The outermost sheet 44*a* is then detached from the immediately underlying sheet 44*b* and discarded. Following this procedure, the immediately underlying sheet 44*b* becomes the outermost sheet of the roll 20, and is available for subsequent use. Notably, and with additional reference to FIG. 2, because in one embodiment the layer of adhesive 36 extends to, and is exposed at, the second side edge 30 as well as at portions of the first side edge 28 (i.e., longitudinally between consecutive ones of the non-adhesive zones 42), a usable adhesive surface area is provided along an entire width of the roll 20 to facilitate contaminant removal of confined surfaces (e.g., corners). Further, a larger percentage of the outermost wrap 80*a* is provided with usable adhesive surface area as compared to conventional contaminant removal tape rolls.

In addition to the set of non-adhesive zones 42 extending from the first side edge 28, in an alternative embodiment, the tape 22 further includes a second set (not shown) of discrete non-adhesive zones, akin to the non-adhesive zones 42 illustrated in FIG. 2, but extending from the second side edge 30. In one alternative embodiment, respective ones of the second set of non-adhesive zones correspond with respective ones of the set of non-adhesive zones 42 shown (e.g., are preferably registered with respect to corresponding ones of the lines of perforations 40). Alternatively, the first set of non-adhesive zones 42 can alternate with the second set of non-adhesive zones such that relative to a longitudinal length of the tape 22, a first non-adhesive zone 42 is formed to extend from the first side edge 28 and a second, longitudinally successive non-adhesive zone is formed to extend from the second side edge 30. In another alternative embodiment, the non-adhesive zones 42 are registered with respect to progressively spaced lines of perforations 40, but do not extend from or otherwise encompass either of the first or second side edges 28, 30.

Figure 5:
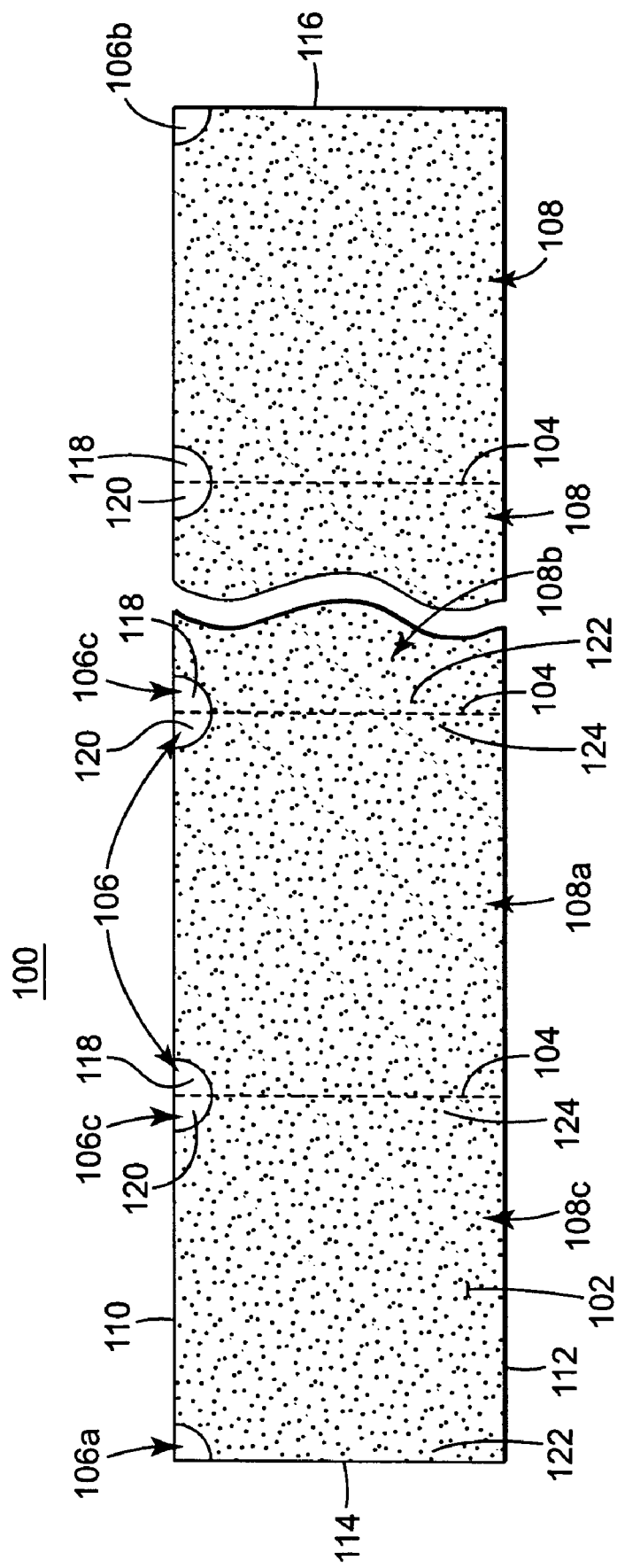
FIG. 5 is a top view of a portion of an alternative embodiment roll of contaminant removal tape in accordance with the present invention, with the tape unrolled.

As previously described, the discrete non-adhesive zones 42 can assume a variety of shapes different from that shown in FIG. 2. For example, FIG. 5 illustrates an alternative embodiment contaminant removal tape 100 suitable for use as a roll (not shown) of contaminant removal tape. The tape 100 is highly similar to that previously described, and includes a backing layer (hidden in the view of FIG. 5 abut akin to the backing layer 38 (FIG. 3) previously described), an adhesive layer 102, a plurality of lines of perforations 104, and a plurality of discrete non-adhesive zones 106. The lines of perforations 104 separate the tape into sheets 108.

The layer of adhesive 102 encompasses, and is exposed relative to, portions of a first side edge 110 of the tape 100 between the non-adhesive zones 106, as well as along an entirety of a second side edge 112. The non-adhesive zones 106 can be formed as previously described (e.g., detackifying material applied over the adhesive layer 102; uncoated portions of the adhesive layer 102; etc.), with respective ones of the non-adhesive zones 106 corresponding with respective ones of the lines of perforations 104. Regardless, the non-adhesive zones 106 include (relative to a roll (not shown) having at least three of the sheets 108) an outermost non-adhesive zone 106*a*, an innermost non-adhesive zone 106*b* and a plurality of intermediate non-adhesive zones 106*c* spaced from one another along a length of the tape 100 between a first longitudinal end 114 and a second longitudinal end 116.

In one embodiment, the intermediate non-adhesive zones 106*c* are identical, each including a tab portion 118 and a release portion 120, with the tab portion 118 and the release portion 120 being generally disposed on opposite sides of a corresponding one of the lines of perforations 104. For example, relative to an adjacent pair of sheets 108, such as the sheets 108*a* and 108*b* identified in FIG. 5, the tab portion 118 is formed at a leading end 122 of the sheet 108*b*, and extends therefrom along the sheet 108*b*. Conversely, the release portion 120 is formed at a trailing end 124 of the sheet 108*a*, and extends therefrom along the sheet 108*a*. The tab portion 118 and the release portion 120 are, in one embodiment, similar in shape, and combine to form the intermediate non-adhesive zone 106*c* as a semi-circle. Relative to the outermost sheet 108*c*, the outermost non-adhesive zone 106*a* is akin to the tab portion 118, whereas the innermost non-adhesive zone 106*b* is akin to the release portion 120.

During use, the non-adhesive zones 106 facilitate visual recognition of the leading end 122 of the outermost sheet 108*c*, as well as initial removal of the outermost sheet 108*c* from a remainder of the roll (not shown) in a manner highly similar to that previously described. In particular, in accordance with one embodiment whereby the lines of perforations 104 are progressively spaced along a longitudinal length of the tape 100 such that the outermost sheet 108*c* slightly overlaps on to itself, the outermost non-adhesive zone 106*a* (i.e., the tab portion 118) that otherwise resides at the leading end 122 of the outermost sheet 108*c* is free of contaminants, and thus is readily identified and grasped by a user. Due to the overlapping wrapped nature of the outermost sheet 108*a*, the corner at which the user grasps the outermost sheet 108*c* (i.e., the corner at which the outermost non-adhesive zone 106*a* is formed) overlays the release portion 120 of the non-adhesive zone 106 formed at the trailing end 124 of the outermost sheet 108*c*. Thus, this relation portion 120 allows the leading end 122 of the outermost sheet 108*c* to be easily lifted from a remainder of the roll and, because it is free of contaminants, further highlights a location of the leading end 122, and in particular the outermost non-adhesive zone 106*a* to the user.

Figure 6B:
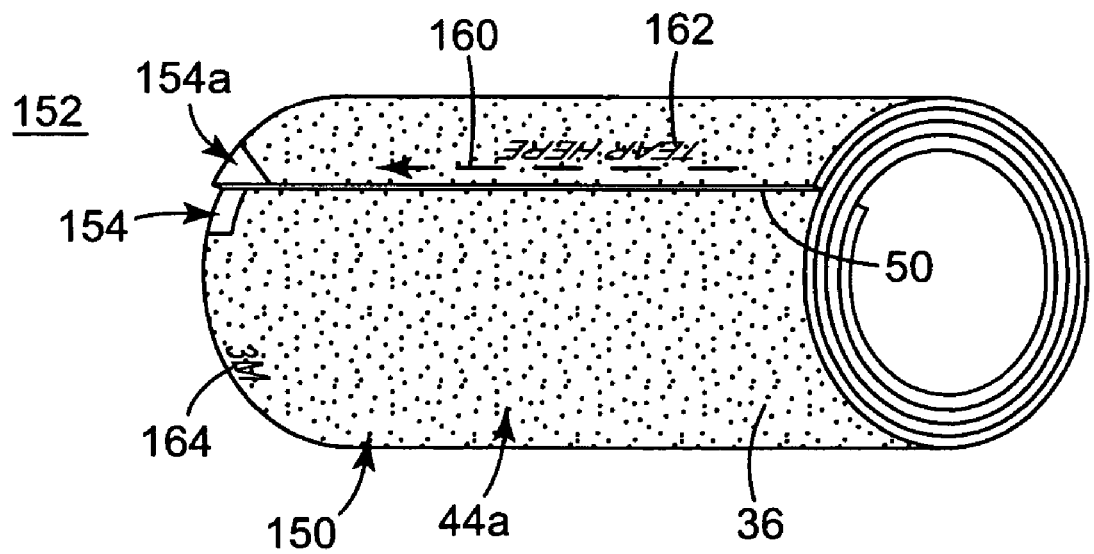
FIG. 6B is a perspective view of the roll of contaminant removal tape of FIG. 6A following a lint removal operation.

As previously indicated, the above-described shapes associated with the non-adhesive zones 42 (FIG. 2), 106 are but two acceptable embodiments in accordance with the present invention. In addition, other features can be included with the roll of contaminant removal tape in accordance with the present invention that further enhance use thereof. For example, FIG. 6A illustrates an alternative embodiment contaminant removal tape 150 in accordance with the present invention for use in a roll 152 (FIG. 6B) of contaminant removal tape. The tape 150 is highly similar to the tape 22 (FIG. 2) previously described, and includes the adhesive layer 36 applied to the backing layer (hidden in the view of FIG. 6A, but shown at 38 in FIG. 3A), the plurality of lines of perforations 40, and a plurality of discrete non-adhesive zones 154 spaced along a longitudinal length of the tape 150, with individual ones of the non-adhesive zones 154 corresponding with respective ones of the lines of perforations 40. The non-adhesive zones 154 are highly similar to the non-adhesive zones 42 (FIG. 2) previously described, except for providing a different shape. In addition, the tape 150 includes printed indicia 160, 162, 164, 166.

The printed indicia 160-166 can assume a wide variety of forms, and is preferably located on the first side 74 (FIG. 3A) of the backing layer 38 (FIG. 3A) under the adhesive layer 36. Alternatively, some or all of the printed indicia 160-166 can be located on the second side 76 (FIG. 3A) of the backing layer 38. Regardless, the indicia 160-166 are preferably printed using an ink having a color or pigment that contrasts from a remainder of the tape 150. For example, in one embodiment, the indicia 160-166 is red, whereas a remainder of the tape 150 is white. Alternatively, any other color combination(s) are equally acceptable.

In one embodiment, the indicia 160 provides a visual identification of the leading end 50 of the outermost sheet 44a, such as in the form of a dashed line. Further, the indicia 160 includes, in one embodiment, an arrowhead that points toward the outermost non-adhesive zone 154a (i.e., a tab portion 170) to facilitate user recognition of where removal of the outermost sheet 44a should be initiated. With this approach, then, the indicia 160 is formed on each of the sheets 44, adjacent the leading end 50 thereof (i.e., adjacent a corresponding one of the lines of perforations 40).

Similarly, in one embodiment, the indicia 162 is provided and consists of words and/or symbols that, in conjunction with the indicia 160, encourages user recognition of the outermost non-adhesive zone 154a. For example, the indicia can consist of the words "TEAR HERE". Alternatively, a number of other words, phrases, and/or symbols can be employed. Preferably, however, the indicia 162 is formed on each of the sheets 44, adjacent the leading end 50 thereof (i.e., adjacent a corresponding one of the lines of perforations 40).

The indicia 164 can be provided along the first side edge 28 of the tape 150, and can consist of promotional words, phrases and/or symbols. In one embodiment, the indicia 164 is repeated along a longitudinal length of the tape 150.

Finally, the indicia 166 can be provided to facilitate registration of the lines of perforations 40 relative to the non-adhesive zones 154 along a longitudinal length of the tape 150. For example, and as described in greater detail below, the non-adhesive zones 154 are, in one embodiment, printed onto the adhesive layer 36 prior to imparting the lines of perforations 40. Subsequently, the lines of perforations 40 can be registered relative to the non-adhesive zones 154 via reference to the registration indicia 166.

FIG. 6B illustrates the roll 152 following a contaminant removal operation. An entirety of an exposed portion of the outermost sheet 44a, except for the non-adhesive zones 154, is covered with contaminant (e.g., lint, particles, etc.), shown with heavy stippling in FIG. 6B. Notably, FIG. 6A depicts the availability of an entire width of the outermost sheet 44a for retaining contaminants. The indicia 160, 162 directs a user's attention to the outermost non-adhesive zone 154a, such that the user can readily identify the optimal location to grasp and initiate removal of the outermost sheet 44a from a remainder of the roll 152.

While the tape 150 of FIGS. 6A and 6B has been described as including each of the indicia 160-166, one or more of the indicia 160-166 can be modified or eliminated, such that the indicia 160, 162, 164, or 166 is not a requisite component of the present invention.

Figure 7:
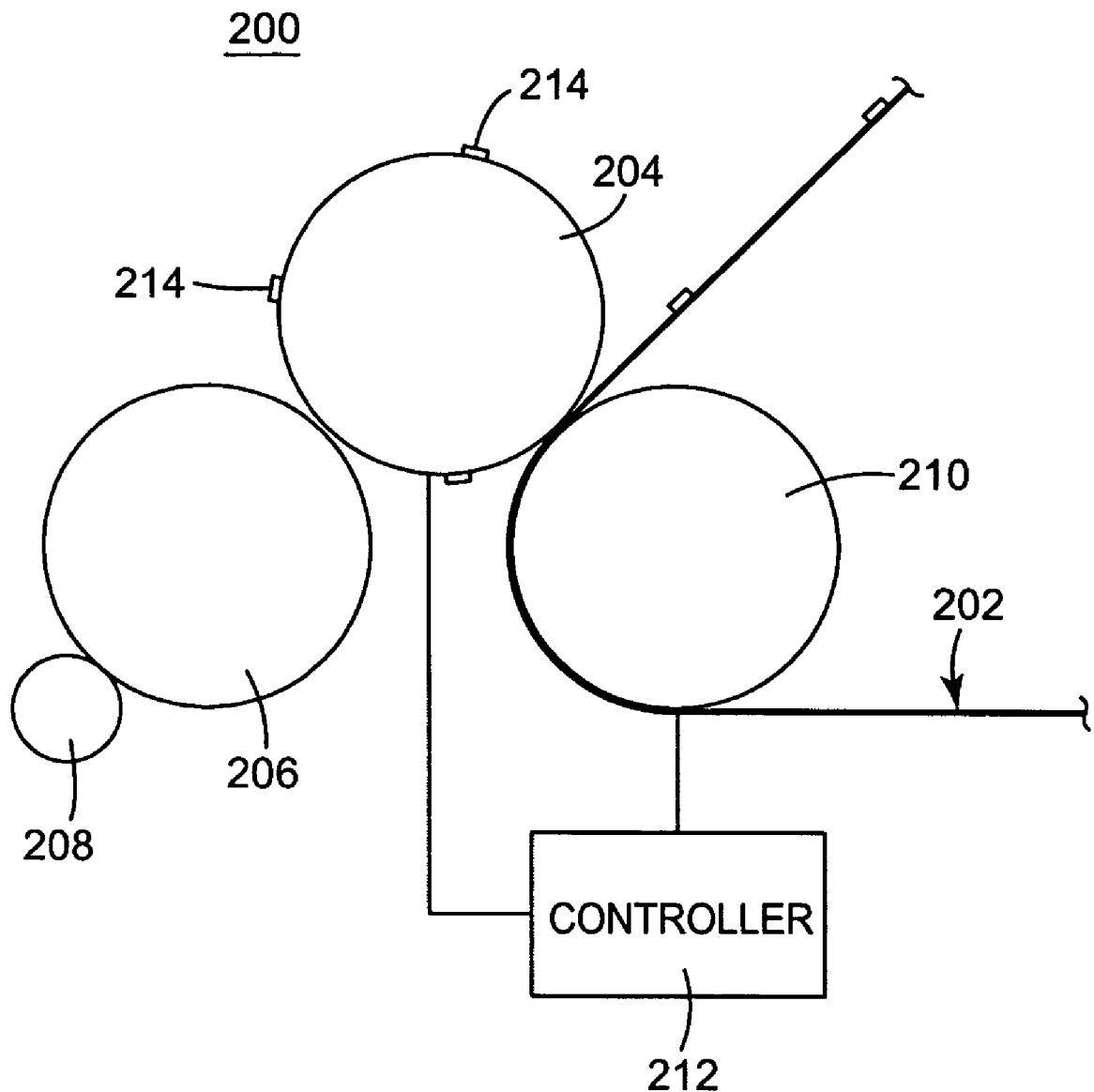
FIG. 7 is a schematic illustration of a system for manufacturing a roll of contaminant removal tape in accordance with the present invention.

One technique for forming the non-adhesive zones in accordance with the present invention is shown schematically in FIG. 7. In particular, a system 200 for processing a web 202 of tape includes a print roller 204, an ink roller 206, a supply 208, a back up roller 210, and a controller 212. The system 200 is, in one embodiment, a flexographic printer, such that the print roller 204 includes one or more raised surfaces (referenced generally at 214) that apply a desired liquefied composition on to the web 202 otherwise passing between the print roller 204 and the back up roller 210. The liquefied composition (e.g., the detackifying material 70 of FIG. 3A in liquefied form) is applied to the raised surface(s) 214 via the ink roller 206, that in turn draws the liquefied composition from the supply source 208 that can be a roller, die, etc. Finally, the controller 212 controls a rotational speed of at least some of the rollers 204, 206, 210

The print roller 204 has a fixed diameter so that the print pattern (i.e., the raised surface(s) 214) repeats relative to a circumference, or fraction thereof, of the print roller 204. The controller 212 causes the print roller 204 to be driven independent of the back up roller 210, which otherwise dictates a travel speed of the web 202. With this in mind, the controller 212 is operated to slow or stop the print roller 204 when the raised surface(s) 214 are not touching the web 202, and accelerate the print roller 204 to the appropriate speed (e.g., corresponding with a rotational speed of the back up roller 210), resulting in printing on the web at varying longitudinal spacings. This rotational speed control can be achieved directly by the controller 212 being separately, electronically linked to the motors (not shown) otherwise rotating the respective rollers 204, 210 or by providing one or more additional drive rollers that otherwise effectuate speed variations at the print roller 204. Regardless, with the system 200, the web 202, otherwise having the layer of adhesive 36 (FIG. 3A) previously applied, can be printed with the detackifying material 70 (FIG. 3A) to form the non-adhesive zones 42 (FIG. 2) with a progressively increasing longitudinal space therebetween. The resultant web 202 can then be processed to form the lines of perforations 40 (FIG. 2), with each of the lines of perforations 40 corresponding with, or registered to, a respective one of the non-adhesive zones 42. Alternatively, the lines of perforations 40 can be formed prior to application of the detackifying material 70. Even further, a wide variety of other manufacturing techniques can be employed to generate contaminant removal tape in accordance with the present invention.

Figure 8:
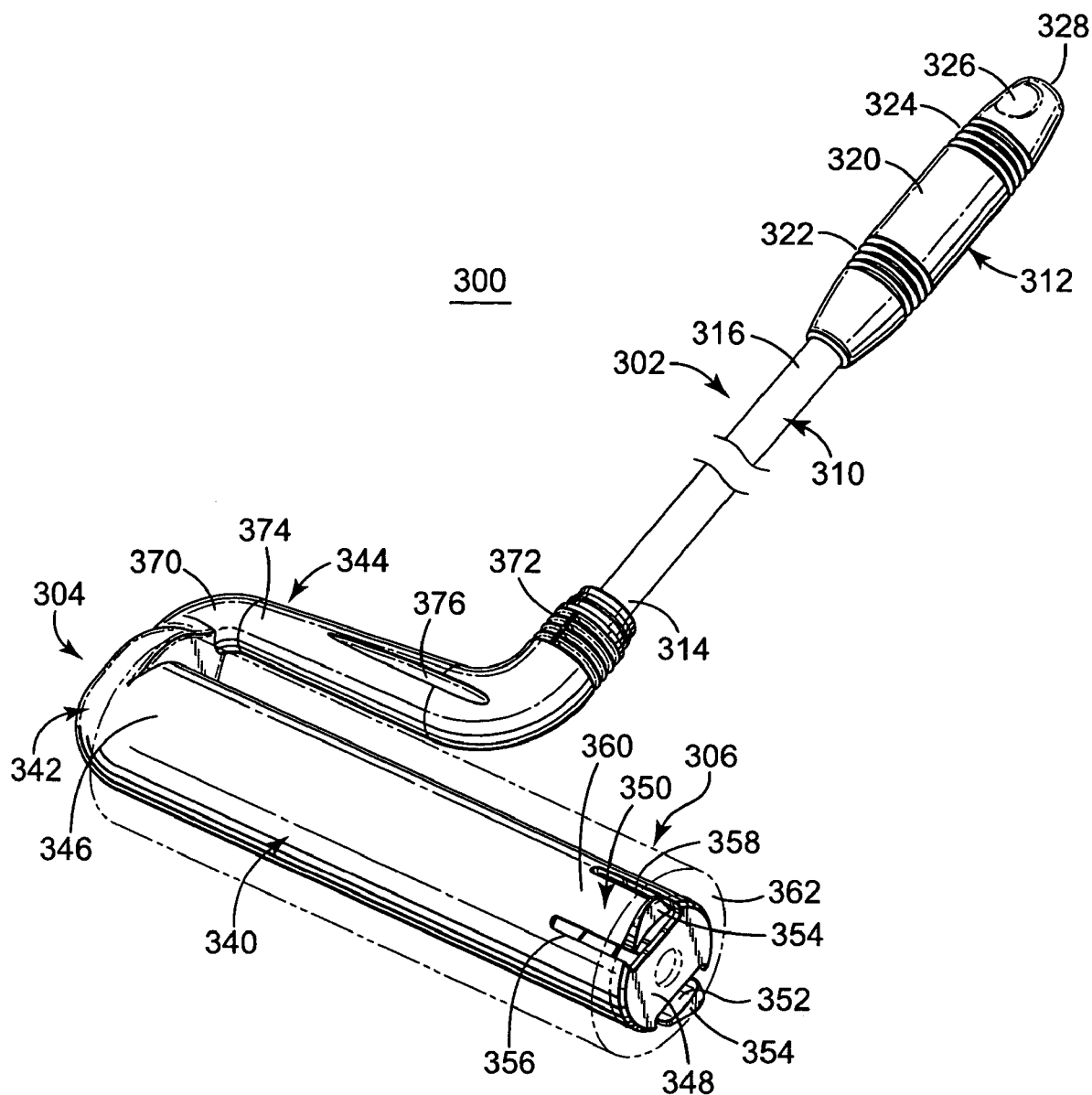
FIG. 8 is a perspective view of one embodiment of an applicator in accordance with the present invention.

Regardless of exact construction, the roll of contaminant removal tape of the present invention can assume a variety of widths, and can be used in conjunction with different applicators. For example, the roll 20 can be used in conjunction with a conventional, relatively small handheld applicator, a relatively large floor cleaning applicator, etc. In short, any suitable applicator may be used, and the present invention is not limited any one applicator configuration. With this in mind, one embodiment of an applicator 300 useful with the present invention is shown in FIG. 8. The applicator 300 includes a handle portion 302 and a tape-receiving portion 304. As a point of reference, FIG. 8 generally depicts a roll 306 of contaminant removal tape with broken lines to better illustrate various features of the applicator 300. In general terms, the roll 306 of contaminant removal tape can be slid onto the tape-receiving portion 304, resulting in a contaminant removal tape assembly.

The handle portion 302 includes, in one embodiment, a shaft 310 and a grip body 312. The shaft 310 is adapted for mounting to the tape-receiving portion 304, as described in greater detail below. Alternatively, the shaft 310 can be integrally formed with the tape-receiving portion 304. Regardless, the shaft 310 can assume a variety of lengths and constructions. In one embodiment, the shaft 310 is sized to facilitate use of the applicator 300 in performing a floor cleaning operation, such that the shaft 310 has a length on the order of 2-5 feet. Alternatively, the shaft 310 can have a shorter or longer length. Further, while the shaft 310 is shown as being a homogenous, unitary body, a collapsible configuration can alternatively be employed, such as by providing the shaft 310 with a telescoping configuration. Regardless, the shaft 310 includes a first end portion 314 and a second end portion 316. The first end portion 314 is adapted for mounting to the tape-receiving portion 304. In one embodiment, the first end portion 314 is permanently attached to the tape-receiving portion 304, such as by a frictional fit, adhesive, welding, etc. Alternatively, the first end portion 314 can be configured for selective attachment to the tape-receiving portion 304, such as by providing the first end portion 314 with threads (not shown) that threadably engage a corresponding surface of the tape-receiving portion 304. The second end portion 316 is adapted to maintain the grip body 312.

The grip body 312 can assume a variety of forms and is preferably adapted to be contoured to ergonomically fit the user's hand. In one embodiment, the grip body 312 is sized for mounting over (e.g., molded) the second end portion 316 of the shaft 310, and includes a central portion 320, opposing grip portions 322, 324, and a hole 326. The grip portions 322, 324 are located at opposite sides of the central portion 320 that is otherwise adapted to receive a user's hand (not shown). In one embodiment, the grip portions 322, 324 are defined by a series of ribs that promote handling of the grip body 312. The hole 326 is provided at an end 328 of the grip body 312 opposite the shaft 310 and provides a convenient means for storing the applicator 300, such as by hanging the applicator 300 on a hook (not shown) via the hole 326. Alternatively, the grip body 312 can assume a wide variety of other configurations, and need not include one or more of the grip portions 322, 324 or the hole 326.

In one embodiment, the tape-receiving portion 304 includes a main body 340, a shoulder 342, and a neck 344. The main body 340 is adapted to selectively capture and retain the roll 306 of contaminant removal tape, and is connected to the shoulder 342. The shoulder 342, in turn, is connected to the neck 344. As described in greater detail below, the neck 344 is adapted to receive the shaft 310.

The main body 340 is defined by opposing first and second ends 346, 348, and is, in one embodiment, generally cylindrical, having a diameter approximating an inner diameter of the roll 306. The first end 346 is attached to the shoulder 342, whereas the second end 348 represents a free end over which the roll 306 of contaminant removal tape can be assembled or removed from the main body 340. In this regard, in one embodiment, the main body 340 includes first and second tongues 350, 352 adjacent the second end 348. Each of the first and second tongues 350, 352 terminates in a radially-extending tab 354 and is separated from a remainder of the main body 340 by first and second slots 356, 358 (relative to the view of FIG. 8, the slots 356, 358 are shown with respect to the first tongue 350, it being understood that the second tongue 352 is similarly defined). With this construction, then, the first and second tongues 350, 352 are deflectable relative to the main body 340, pivoting at an end point 360 that is otherwise connected to the main body 340. In particular, each of the tongues 350, 352 are configured to assume and maintain an undeflected state (FIG. 8) in which the tabs 354 project radially outwardly relative to a circumference defined by a remainder of the main body 340 at the second end 348. This undeflected state is further shown in FIG. 9. An outer diameter defined by a combination of the tabs 354 is greater than an inner diameter of the roll 306 of contaminant removal tape such that when the roll 306 is assembled over the main body 340, the tabs 354 prevent the roll 306 from inadvertently sliding over the second end 348. Conversely, when a user desires to assemble the roll 306 to the main body 340 and/or remove a previously-assembled roll 306 from the main body 340, the tongues 350, 352 are manually compressed toward one another (such as by squeezing the tabs 354) to a point whereby the combined outer diameter defined by the tabs 354 is less than an inner diameter of the roll 306, thereby allowing the roll 306 to slide over the second end 348. Upon removal of the compressive force, the tongues 350, 352 naturally return to the undeflected position of FIGS. 8 and 9, such that the tabs 354 prevent overt sliding of the roll 306 over the second end 348.

Figure 9:
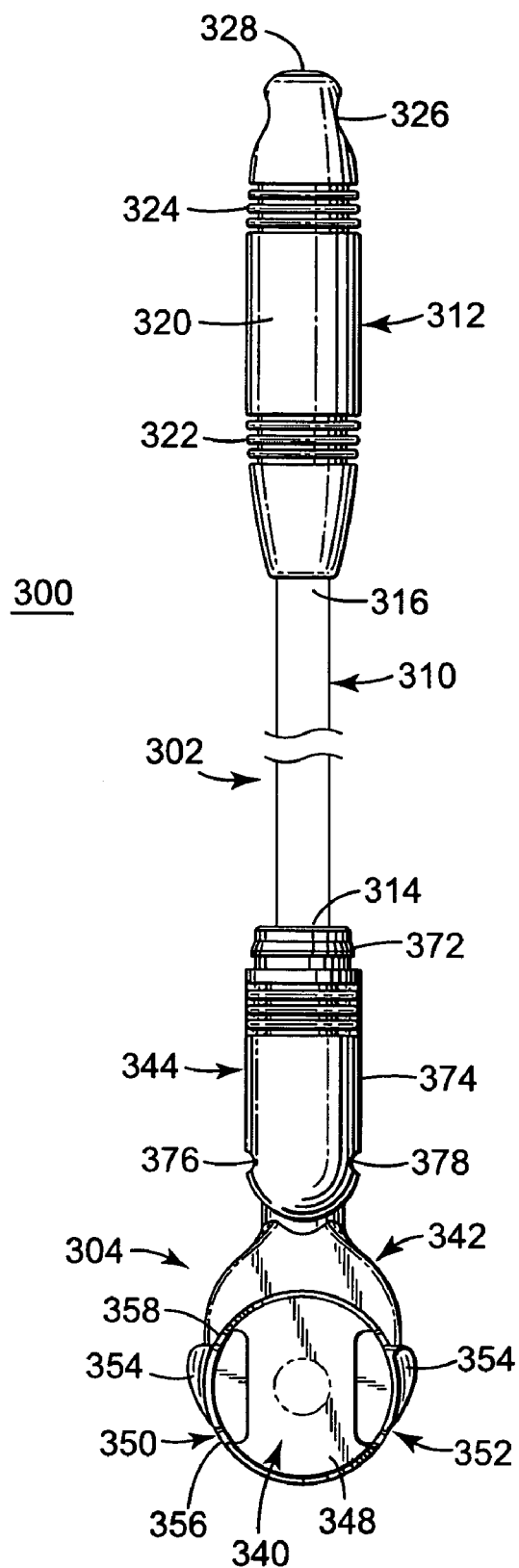
FIG. 9 is a side view of the applicator of FIG. 8.

In one embodiment, the tabs 354 are relatively thin, such that a side edge 362 of the roll 306 can be positioned in close proximity to the second end 348 of the main body 340. As such, the applicator 300 is conducive to positioning the side edge 362 of the roll 306 along confined surfaces, such as a surface terminating at a wall or corner. As previously described, the side edge 362 of an outermost sheet (not shown) of the roll 306 preferably provides an exposed adhesive layer (not shown), such that nearly complete cleaning can be achieved along the confined surface. In other words, the applicator 300 facilitates positioning of the side edge 362 in close proximity to a corner or wall for cleaning of a desired surface. The applicator 300 is useful with both coreless and core-mounted rolls of contaminant removal tape. In one embodiment, the tabs 354 are configured to facilitate optimal use of a coreless roll. In particular, and as best shown in FIG. 9, the tabs 354 have a tear drop-like shape in radial extension relative to the tongue 350/352. More particularly, a radial width of the tabs 354 tapers from top to bottom (relative to the applicator 300 being in the upright position of FIG. 9). By way of reference, during use, the applicator 300 is initially grasped with the handle in the generally upright position of FIG. 9, and then tilted slightly (e.g., 15°-45° relative to horizontal) to naturally maneuver the roll 306 along a surface. In this angled position, the tab 354 closest to the surface being cleaned will not contact the surface due to the tapered radial width, even where the coreless roll 306 has only a few sheet (not shown) remaining.

The shoulder 342 extends from the first end 346 of the main body 340 and is connected at an opposite end thereof to the neck 344. In this regard, a spacing provided by the shoulder 342 relative to the main body 340 is preferably commensurate with a thickness of a new (or un-used) roll 306 such that the roll 306 can rotate about the main body 340.

The neck 344 includes a first end 370, a second end 372, and a central portion 374. The first end 370 is connected to the shoulder 342, whereas the second end 372 is adapted to receive the shaft 310. The central portion 374 is preferably configured to centrally locate the second end 372 relative to a length of the main body 340 to facilitate handling of the applicator 300. Further, in one embodiment, the central portion 374 defines opposing grooves 376, 378, as best shown in FIG. 9. The grooves 376, 378 are sized to receive and frictionally retain a cover (not shown) that is otherwise assembled to the applicator 300 to encompass or cover the roll 306 that is otherwise secured to the main body 340. Alternatively, the grooves 376, 378 can be omitted.

The roll of contaminant removal tape of the present invention provides a marked improvement over previous designs. Users can easily find, lift and remove a used tape sheet from the roll of contaminant removal tape. By limiting the surface area of non-adhesive regions provided on the outermost wrap of contaminant removal tape, an increased usable surface area is provided as compared to conventional contaminant removal tape rolls. Further, one of the side edges of the contaminant removal tape can include exposed adhesive, thereby enhancing the ability of the roll of contaminant removal tape of the present invention to access and clean confined surfaces.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A contaminant removal tape for use as a roll of contaminant removal tape, the tape being defined by opposing first and second longitudinal ends, opposing first and second side edges, and opposing first and second major surfaces, the tape comprising:
a backing layer having a first side and a second side an adhesive layer on the first side of the backing layer, wherein the adhesive layer defines a portion of the first major surface;
a plurality of lines of perforations extending across at least most of a width of the tape between the first and second side edges to separate the tape into sheets, wherein each sheet is further defined by the opposing side edges of the tape; and
non-adhesive zones formed on the first major surface each of the sheets, the non-adhesive zones being limited to:
a first set of non-adhesive zones all of which extend from the first side edge of the tape, and
a second set of non-adhesive zones all of which extend from the second side edge of the tape.

2. A roll of contaminant removal tape, the tape including opposing first and second longitudinal ends, opposing first and second side edges, and opposing first and second major surfaces, the roll of tape comprising:
a backing layer having a first side and a second side;
an adhesive layer on the first side of the backing layer, wherein the adhesive layer defines a portion of the first major surface of the tape;
wherein the tape is wound into a roll;
a plurality of lines of perforations extending across at least most of a width of the tape between the first and second side edges to separate the tape into sheets with each line of perforations defining a leading end of an inner sheet and a trailing end of an outer sheet in wound form, wherein the lines of perforations are arranged such that starting from an inside of the roll, the sheets have progressively increasing longitudinal lengths from the second longitudinal end to of the tape to the first longitudinal end of the tape; and
a set of discrete non-adhesive zones provided along the first major surface of the tape, wherein respective ones of the non-adhesive zones are registered with respective ones of the lines of perforations such that with respect to each pair of adjacent inner and outer sheets, the corresponding non-adhesive zone defines a tab portion on the inner sheet and a release portion on the outer sheet, the registration of the non-adhesive zones with the lines of perforations characterized by, in wound form, the trailing end of the outer sheet is covered and the leading end of the outer sheet overlies the release portion of the outer sheet.

3. The roll of tape of claim 2, wherein a longitudinal spacing between consecutive ones of the non-adhesive zones increases from the second longitudinal end of the tape to the first longitudinal end of the tape.

4. The roll of tape of claim 2, wherein at least one of the non-adhesive zones extends from the first side edge.

5. The roll of tape of claim 2, wherein at least one of the non-adhesive zones does not extend from either of the first and second side edges.

6. A roll of contaminant removal tape, the tape including opposing first and second longitudinal ends, opposing first and second side edges, and opposing first and second major surfaces, the roll of tape comprising:
a backing layer having a first side and a second side;
an adhesive layer on the first side of the backing layer, wherein the adhesive layer defines a portion of the first major surface of the tape;
wherein the tape is wound into a roll;
a plurality of lines of perforations extending across at least most of a width of the tape between the first and second side edges to separate the tape into sheets each having a leading end and a trailing end, wherein in wound form, two consecutive sheets define an outer sheet and an inner sheet relative to one another such that the trailing end of the outer sheet is adjacent the leading end of the inner sheet; and
a first set of discrete non-adhesive zones provided along the first major surface of the tape, wherein each of the non-adhesive zones of the first set of non-adhesive zones extends from the first side edge, and wherein relative to the two consecutive sheets, the non-adhesive zones of the first set of non-adhesive zones include:
an outer sheet tab portion formed on the outer sheet and extending from the leading end thereof,
an outer sheet release portion formed on the outer sheet and extending from the trailing end thereof,
an inner sheet tab portion formed on the inner sheet and extending from the leading end thereof,
an inner sheet release portion formed on the outer sheet and extending from the trailing end thereof,
wherein in wound form, the outer sheet is partially wrapped onto itself and the outer sheet tab portion is wrapped beyond the inner sheet tab portion and overlies the outer sheet release portion.

7. The roll of tape of claim 6, further comprising:
a second set of discrete non-adhesive zones provided along the first major surface of the tape, wherein each of the non-adhesive zones of the second set of non-adhesive zones extends from the second side edge.

8. The roll of tape of claim 7, wherein respective ones of the first set of nonadhesive zones are transversely aligned with respective ones of the second set of non-adhesive zones.

9. The roll of tape of claim 6, wherein respective ones of the non-adhesive zones correspond with respective ones of the lines of perforations.

10. The roll of tape of claim 9, wherein respective ones of the non-adhesive zones extend across a portion of respective ones of the lines of perforations.

11. The roll of tape of claim 10, wherein the lines of perforations are arranged such that starting from an inside of the roll, the sheets have progressively increasing lengths from the second longitudinal end of the tape to the first longitudinal end of the tape.

12. The roll of tape of claim 10, wherein the non-adhesive zones are arranged such that starting from an inside of the roll, a longitudinal spacing between adjacent non-adhesive zones progressively increases from the second longitudinal end of the tape to the first longitudinal end of the tape.

13. The roll of tape of claim 6, wherein the wound roll defines an outermost sheet and an innermost sheet, and further wherein the first set of non-adhesive zones includes a first non-adhesive zone encompassing a portion of the leading end of the outermost sheet and a second non-adhesive zone encompassing a portion of the trailing end of the outermost sheet.

14. The roll of tape of claim 13, wherein the second non-adhesive zone encompasses a portion of the leading end of an immediately underlying sheet.

15. The roll of tape of claim 14, wherein the first set of non-adhesive zones further includes a third non-adhesive zone encompassing a portion of the trailing end of the immediately underlying sheet.

16. The roll of tape of claim 13, wherein a longitudinal spacing is defined between the first and second non-adhesive zones, and further wherein the adhesive layer defines the first major surface of the tape along the longitudinal spacing.

17. The roll of tape of claim 13, wherein the first set of non-adhesive zones are arranged such that relative to the roll, the leading end of the outermost sheet lies on the second non-adhesive zone.

18. The roll of tape of claim 17, wherein the first non-adhesive zone defines a tab portion for grasping the leading end of the outermost sheet, and the second non-adhesive zone defines a release portion for releasing the leading end of the outermost sheet from a remainder of the roll.

19. The roll of tape of claim 6, wherein the adhesive layer defines an entirety of the first major surface of the tape except at the non-adhesive zones.

20. The roll of tape of claim 6, wherein the adhesive layer defines not less than 92% of the first major surface of the tape.

21. The roll of tape of claim 6, wherein the adhesive layer defines an entirety of the first major surface of the tape along the second side edge and a portion of the first major surface along the first side edge.

22. The roll of tape of claim 6, wherein the first set of non-adhesive zones includes an outermost non-adhesive zone extending from the leading end of an outermost sheet, an innermost non-adhesive zone extending from the trailing end of an innermost sheet, and a plurality of intermediate non-adhesive zones disposed between the outermost and innermost non-adhesive zones, each of the intermediate non-adhesive zones including a release portion and a tab portion, and further wherein relative to consecutive first and second sheets, the release portion extends along the first sheet from the trailing end of the first sheet and the tab portion extends along the second sheet from the leading end of the second sheet.

23. The roll of tape of claim 6, wherein the adhesive layer encompasses an entire width of the first side of the backing layer, the tape further comprising:
 a detackifying material disposed on the adhesive layer to define the nonadhesive zones.

24. The roll of tape of claim 23, wherein the detackifying material is selected from the group consisting of varnish, lacquer, wax, and ink.

25. The roll of tape of claim 6, wherein the first set of non-adhesive zones includes an outermost non-adhesive zone extending from the leading end of an outermost sheet, an innermost non-adhesive zone extending from the trailing end of an innermost sheet, and a plurality of intermediate non-adhesive zones disposed between the outermost and the innermost non-adhesive zones, and further wherein the intermediate non-adhesive zones have identical shapes.

26. The roll of tape of claim 6, wherein at least one of the non-adhesive zones includes a first, rectangular portion and a second, triangular portion.

27. The roll of tape of claim 6, wherein at least one of the non-adhesive zones has a semi-circular shape.

28. The roll of tape of claim 6, further comprising:
 printed indicia viewable at the first major surface identifying a location of a corresponding one of the non-adhesive zones.

\* \* \* \* \*

UNITED STATES PATENT AND TRADEMARK OFFICE
CERTIFICATE OF CORRECTION

PATENT NO. : 7,744,975 B2  Page 1 of 1
APPLICATION NO. : 10/884575
DATED : June 29, 2010
INVENTOR(S) : John Lee Thiele It is certified that error appears in the above-identified patent and that said Letters Patent is hereby corrected as shown below:

Column 7

Line 5; Delete "compostable" and insert -- compositible --, therefor.

Column 8

Line 27; After "22" insert -- . --.

Column 12

Line 10; After "210" insert -- . --.

Signed and Sealed this

Twenty-first Day of December, 2010

David J. Kappos
*Director of the United States Patent and Trademark Office*